3,709,870
Patented Jan. 9, 1973

3,709,870
DISAZO DYESTUFFS
Gerhard Wolfrum, Leverkusen, Germany, assignor to Farbenfabriken Bayer Aktiengesellschaft, Leverkusen, Germany
No Drawing. Filed June 4, 1970, Ser. No. 43,581
Claims priority, application Germany, June 13, 1969, P 19 30 261.5
Int. Cl. C07c 107/06; C09b 31/04
U.S. Cl. 260—186    3 Claims

ABSTRACT OF THE DISCLOSURE

Disazo dyestuffs, containing 1 sulphonic acid group, of the general formula

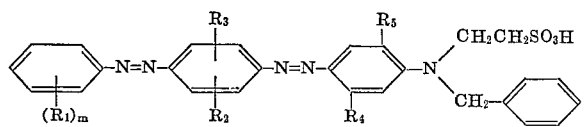

wherein
$R_1$ represents hydrogen, chlorine, bromine or a methyl, ethyl or trifluoromethyl group,
$R_2$ and $R_3$ denote hydrogen or independently of one another denote chlorine, bromine or a methyl, ethyl, methoxy or ethoxy group,
$R_4$ represents hydrogen, chlorine, bromine or a methyl, ethyl, methoxy or ethoxy group or the residue $NHCOC_nH_{2n+1}$, with $n$ representing a number from 0 to 4,
$R_5$ denotes hydrogen or a methyl, methoxy or ethoxy group, and
$m$ represents an integer from 1 to 5.

The new dyestuffs are especially suitable for the dyeing of nitrogen-containing materials. They are very well absorbed on polyamide fibers from acid and neutral dyebaths.

The subject of the invention is new disazo dyestuffs, containing 1 sulphonic acid group, of the formula

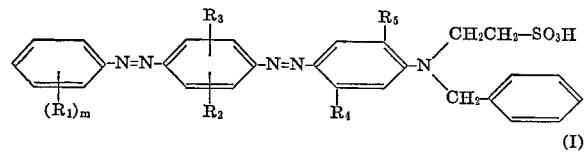

processes for their manufacture and their use for dyeing nitrogen-containing fiber materials.

In general Formula I,
$R_1$ represents hydrogen, chlorine, bromine or a methyl, ethyl or trifluoromethyl group,
$R_2$ and $R_3$, which may be identical or different from one another, represent hydrogen, chlorine, bromine, or a methyl, ethyl, methoxy or ethoxy group,
$R_4$ represents hydrogen, chlorine, bromine, a methyl, ethyl, methoxy or ethoxy group or the residue $NHCOC_nH_{2n+1}$ ($n=0-4$),
$R_5$ represents hydrogen, or a methyl, methoxy or ethoxy group, and
$m$ denotes an integer from 1–5.

A particularly valuable group of dyestuffs within the framework of Formula I corresponds to the formula

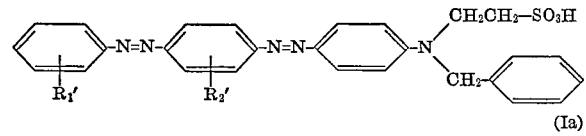

wherein
$R_1'$, $R_2'$ and $R_4'$ independently of one another represent hydrogen or a methyl or ethyl group.

A very particularly valuable compound within the framework of the new dyestuffs of Formula I corresponds to the formula

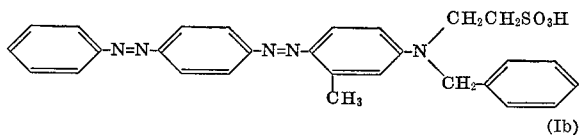

The new disazo dyestuffs (I) are manufactured by diazotising amines of formula

wherein $R_1$ and $m$ have the above-mentioned significance, and coupling with amines of Formula III or their derivatives (IV) or (V) which are protected in the amino group,

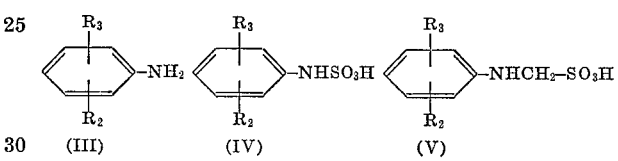

wherein $R_2$ and $R_3$ have the above-mentioned significance. The monoazo dyestuffs of formula

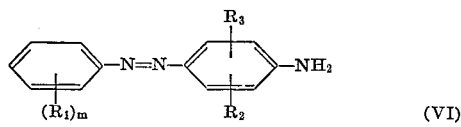

obtainable in this way, wherein $R_1$, $R_2$, $R_3$ and $m$ have the above-mentioned significance, are diazotised—where appropriate after liberating the amino group by acid or alkaline saponification if coupling components (IV) or (V) are used—and coupled with an amine of formula

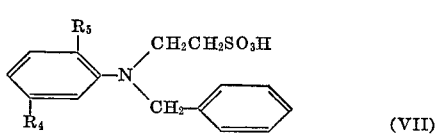

wherein $R_4$ and $R_5$ have the abovementioned significance.

Diazo components of Formula II are for example: aniline, 2-aminotoluene, 3-aminotoluene, 4-aminotoluene, 2-amino-ethylbenzene, 3-amino-ethylbenzene, 4-aminoethylbenzene, 2-trifluoromethylaniline, 4-trifluoromethylaniline, 2-chloraniline, 3-chloraniline, 4-chloraniline, 2-bromaniline, 3-bromaniline, 4-bromaniline, 1-amino-2,3-dimethylbenzene, 1-amino-2,4-dimethylbenzene, 1-amino-2,5-dimethylbenzene, 1-amino-2,4-diethylbenzene, 2,3-dichloraniline, 2,4-dichloraniline, 2,5-dichloraniline, 3,4-dichloraniline, 2,4-dibromaniline, 2,5-dibromaniline, 1-amino-2,4,5-trimethylbenzene, 1-amino-2,3,5-trimethylbenzene, 2,4,5-trichloraniline, 2,3,4,5-tetrachloraniline, pentachloraniline, 4-chlor-2-aminotoluene, 5-chlor-2-aminotoluene, 4-chloro-2-trifluoromethylaniline, 3-chloro-2-methylaniline, 2-methyl-4,5-dichloraniline, 6-chloro-3-methylaniline, 5-trifluoromethyl-2-chloraniline, 4-chloro-3-methylaniline, 4,6-dichloro-3-methylaniline and 3-chloro-4-methylaniline.

Middle components of Formula III are for example: aniline, 2-aminotoluene, 3-aminotoluene, 2-amino-ethylbenzene, 3-aminoethylbenzene, 3-chloraniline, 3-bromaniline, 2-aminoanisole, 3-aminoanisole, 2-amino-ethoxybenzene, 3-amino-ethoxybenzene, 1-amino-2,5-dimethylbenzene, 1-amino-2,3-dimethylbenzene, 1-amino-3,5-dimethylbenzene, 3-amino-4-methoxy-toluene, 2-amino-4-methoxy-toluene, 2-amino-1,4-dimethoxybenzene, 2-amino-4-ethoxy-toluene and 2-amino-1,4-diethoxybenzene.

Amines of the Formula III which easily form diazoamino compounds instead of azo compounds with diazonium compounds, can also be employed for the coupling in the form or their N-sulphonic acids (IV) or ω-methanesulphonic acids (V).

End components of Formula VII are for example:

N-benzyl-N-(β-sulphoethyl)-aniline,
3-[N-benzyl-N-(β-sulphoethyl)-amino]-toluene,
3-[N-benzyl-N-(β-sulphoethyl)-amino]-ethylbenzene,
3-[N-benzyl-N-(β-sulphoethyl)-amino]-chlorobenzene,
3-[N-benzyl-N-(β-suphoethyl)-amino]-bromobenzene,
3-[N-benzyl-N-(β-sulphoethyl)-amino]-anisole,
3-[N-benzyl-N-(β-sulphoethyl)-amino]-ethoxybenzene,
3-[N-benzyl-(β-sulphoethyl)-amino]-formanilide,
3-[N-benzyl-N-(β-sulphoethyl)-amino]-acetanilide,
3-[N-benzyl-N-(β-sulphoethyl)-amino]-propionic acid anilide,
4-acetylamino-2-[N-benzyl-N-(β-sulphoethyl)-amino]-toluene,
4-acetylamino-2-[N-benzyl-N-(β-sulphoethyl)-amino]-anisole,
4-acetylamino-2-[N-benzyl-N-(β-sulphoethyl)-amino]-ethoxybenzene,
4-formylamino-2-[N-benzyl-N-(β-sulphoethyl)-amino]-anisole,
4-propionylamino-2-[N-benzyl-N-(β-sulphoethyl)-amino]-anisole,
2-[N-benzyl-N-(β-sulphoethyl)-amino]-1,4-dimethoxybenzene, and
2-[N-benzyl-N-(β-sulphoethyl)-amino]-1,4-diethoxybenzene.

The diazo components of Formula II are diazotised in a known manner, for example in acid, aqueous solution with sodium nitrite solution at 0–5° C., and combined with the coupling components of Formulae III, IV or V. The coupling can for example be carried out in a neutral to strongly acid pH range in aqueous or organic-aqueous medium. The aminoazo dyestuffs (VI) obtainable in this way are water-insoluble and are therefore easy to isolate and obtainable in the pure form. If the amines IV) or (V) are employed as coupling components, the water-insoluble aminoazo dyestuffs (VI) are easily obtained by acid or alkaline saponification.

The further diazotisation of the aminoazo dyestuffs (VI) can for example take place in acid, aqueous dispersion with sodium nitrite solution or in concentrated sulphuric acid or concentrated phosphoric acid with nitrosylsulphuric acid. The diazotisation temperatures can be between 0° C. and 30° C. The coupling with the end components (VII) to give the disazo dyestuffs (I) also takes place in a manner which is in itself known, for example in neutral, weakly acid or strongly acid, aqueous medium or also in an aqueous-organic medium. The disazo dyestuffs of Formula I are mostly very sparingly soluble in an acid medium and can therefore be isolated by a simple filtering-off. If the dyestuffs are obtained in an impure form, they can be recrystallised in the usual manner from hot water, optionally with the addition of alkalis. The dyestuffs (I) can be quantitatively separated out from alkaline solution by adding salt. The sparingly water-soluble dyestuffs (I) isolated under acid conditions can be easily rendered water-soluble by, for example, mixing them with salts of strong bases and weak acids, for example trisodium phosphate, disodium hydrogen phosphate, sodium tetraborate, sodium metaphosphate, sodium metasilicate, sodium carbonate and the like.

The dyestuffs of Formula I are suitable for dyeing nitrogen-containing materials such as wool and silk, but preferably synthetic polyamide and polyurethane fiber, in clear color shades having very good general fastness properties.

The dyestuffs are very well absorbed on polyamide fiber both from an acid dyebath and also from a neutral dyebath.

In the examples which follow the parts denote parts by weight and the percentages denote percentages by weight.

EXAMPLE 1

197 parts of 4-aminoazobenzene are finely powdered and introduced at room temperature, whilst stirring, into 1200 parts of 8% strength hydrochloric acid. The suspension thus produced is stirred for some hours. 69 parts of sodium nitrite dissolved in 250 parts of water are then added dropwise at 5–15° C. The diazonium salt solution thus manufactured is freed of a little insoluble matter by filtration and is then added to a solution, adjusted to pH=4–5, of 308 parts of 3-[N-benzyl-N-(β-sulphoethyl)-amino]-toluene in 2500 parts of water. A pH-value of 4–5 is maintained during the coupling by simultaneous addition of sodium hydroxide solution. After completion of coupling, the dyestuff is filtered off, washed once or twice with water and dried.

515 parts of dyestuff of formula

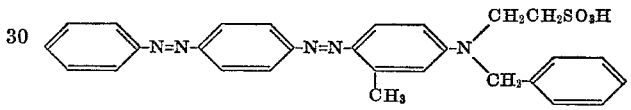

are obtained.

The dyestuff isolated under acid conditions, which is relatively sparingly water-soluble, can be converted to an easily water-soluble form by mixing with small amounts of salts of strong bases and weak acids, such as trisodium phosphate, disodium hydrogen phosphate, sodium tetraborate, sodium metaphosphate, sodium metasilicate, sodium carbonate and the like. The dyestuff dyes polyamide filaments from an acid or neutral dyebath in a strong yellowish-tinged red with good to very good fastness properties.

EXAMPLE 2

10.7 parts of 2-aminotoluene are diazotised in the usual manner and coupled with 10.7 parts of 3-aminotoluene in a weakly acid, aqueous solution to give the dyestuff of formula

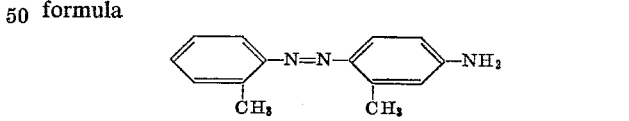

22.5 parts of this aminoazo dyestuff are stirred for several hours in 200 parts of 8% strength hydrochloric acid and are then diazotised at 5–20° C. with a solution of 6.9 parts of sodium nitrite in 30 parts of water. The clear diazonium salt solution is combined at pH 4–5 with a solution of 31 parts of 3-[N-benzyl-N-(β-sulphonyl)-amino]-toluene in 250 parts of water. During the coupling the pH-value is kept at 4–5 by dropwise addition of sodium hydroxide solution. After completion of coupling, the disazo dyestuff of formula

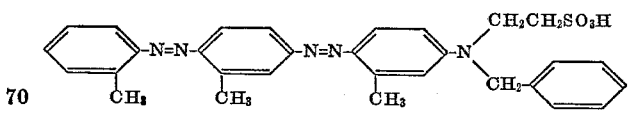

is filtered off, washed with 2% strength sodium chloride solution and dried. 58 parts of a dark brown powder which dyes polyamide, fiber from acid or neutral liquor in a yellowish-tinged red are obtained.

EXAMPLE 3

10.7 parts of 2-aminotoluene are diazotised in the usual manner and combined in a neutral to weakly acid solution with 20.1 parts of the compound of formula

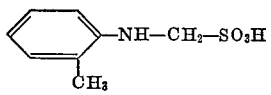

After completion of coupling, the mixture is rendered alkaline by adding 200 parts of 10% strength sodium hydroxide solution and the alkaline solution is thereafter heated to the boil for 30 minutes. After cooling, the aminoazo dyestuff of formula

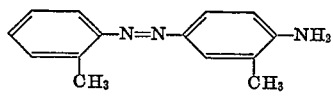

is filtered off, washed with water until neutral and stirred for several hours at room temperature in 200 parts of 8% strength hydrochloric acid. A solution of 6.9 parts of sodium nitrite in 30 parts of water is then added at 5–20° C. and the mixture is stirred until a clear solution is produced. After destroying an excess of nitrous acid with amidosulphonic acid, the diazonium salt solution is added to a solution of 31 parts of 3-[N-benzyl-N-(β-sulphoethyl)-amino]-toluene in 250 parts of water. A pH-value of 4–5 is established during the coupling by simultaneous dropwise addition of sodium hydroxide solution. After completion of the coupling, the dyestuff of formula

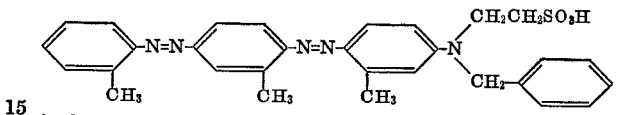

is filtered off, washed with 2% strength sodium chloride solution and dried. The dyestuff dyes polyamide filaments from acid and neutral baths in yellowish-tinged red shades.

The table which follows quotes further dyestuffs obtained according to the invention, which dye polyamide filaments in the shades indicated:

| Construction | Shade on perlon |
|---|---|
| H₃C—⟨⟩—N=N—⟨⟩—N=N—⟨⟩(CH₃)—N(CH₂CH₂SO₃H)(CH₂—⟨⟩) | Yellowish-tinged red. |
| H₃C—⟨⟩(CH₃)—N=N—⟨⟩—N=N—⟨⟩(CH₃)—N(CH₂CH₂SO₃H)(CH₂—⟨⟩) | Do. |
| ⟨⟩—N=N—⟨⟩(CH₃)—N=N—⟨⟩(CH₃)—N(CH₂CH₂SO₃H)(CH₂—⟨⟩) | Do. |
| H₃C—⟨⟩(CH₃,CH₃)—N=N—⟨⟩(CH₃,CH₃)—N=N—⟨⟩—N(CH₂CH₂SO₃H)(CH₂—⟨⟩) | Do. |
| ⟨⟩(Cl)—N=N—⟨⟩(CH₃)—N=N—⟨⟩(CH₃)—N(CH₂CH₂SO₃H)(CH₂—⟨⟩) | Red. |
| H₃C₂—⟨⟩—N=N—⟨⟩—N=N—⟨⟩(CH₃)—N(CH₂CH₂SO₃H)(CH₂—⟨⟩) | Yellowish-tinged red. |
| ⟨⟩(CF₃)—N=N—⟨⟩—N=N—⟨⟩(CH₃)—N(CH₂CH₂SO₃H)(CH₂—⟨⟩) | Red. |
| F₃C—⟨⟩(Cl)—N=N—⟨⟩—N=N—⟨⟩—N(CH₂CH₂SO₃H)(CH₂—⟨⟩) | Red. |
| H₃C—⟨⟩—N=N—⟨⟩(OCH₃)—N=N—⟨⟩(CH₃)—N(CH₂CH₂SO₃H)(CH₂—⟨⟩) | Red. |
| H₃C—⟨⟩—N=N—⟨⟩(CH₃,OCH₃)—N=N—⟨⟩(CH₃)—N(CH₂CH₂SO₃H)(CH₂—⟨⟩) | Red. |
| Cl—⟨⟩—N=N—⟨⟩(Cl)—N=N—⟨⟩(CH₃)—N(CH₂CH₂SO₃H)(CH₂—⟨⟩) | Red. |

| Construction | Shade on perlon |
|---|---|
| 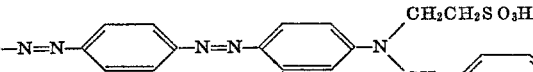 | Red. |
| 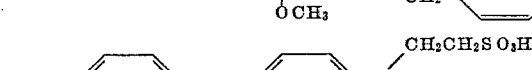 | Red. |
| 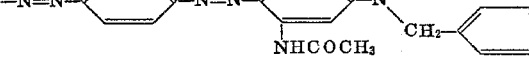 | Red. |
| 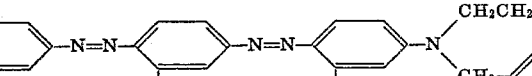 | Bluish-tinged red. |

What is claimed is:

1. Disazo dyestuffs, containing one sulphonic acid group, of the general formula

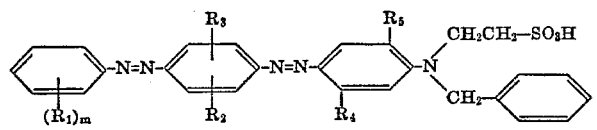

wherein $R_1$ represents chlorine, bromine, methyl, ethyl or trifluoromethyl, $R_2$ represents hydrogen or represents a member of the group consisting of chlorine, bromine, methyl, ethyl, methoxy or ethoxy, $R_3$ represents hydrogen or represents a member of the group consisting of chlorine, bromine, methyl, ethyl, methoxy or ethoxy, $R_4$ represents hydrogen or a member of the group consisting of chlorine, bromine, methyl, ethyl, methoxy, ethoxy and $NHCOC_nH_{2n+1}$ with $n$ representing a number from 0 to 4, $R_5$ represents hydrogen or represents a member of the group consisting of methyl, methoxy and ethoxy, and $m$ represents an integer from 0 to 5 and when $m$ is 2–5 the members $R_1$ are the same or different.

2. Disazo dyestuffs, containing one sulphonic acid group, of the general formula

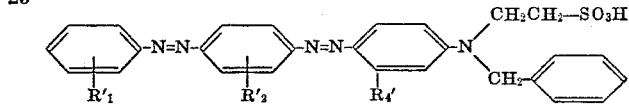

wherein $R_1'$, $R_2'$, and $R_4'$ independently of one another represent a member selected from the group consisting of methyl and ethyl.

3. Dyestuff of formula

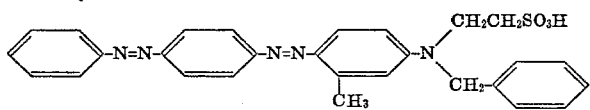

References Cited

UNITED STATES PATENTS 2,216,446 10/1940 McNally et al. _____ 260—186
2,289,413 7/1942 Ellis et al. _____ 260—187

LEWIS GOTTS, Primary Examiner
C. F. WARREN, Assistant Examiner

U.S. Cl. X.R.
260—174, 177, 184, 187, 205, 206, 207.3